United States Patent Office 3,736,231
Patented May 29, 1973

3,736,231
PREPARATION OF INSOLUBILIZED ENZYMES
William L. Stanley, Richmond, and Alfred C. Olson, El Cerrito, Calif., assignors to the United States of America as represented by the Secretary of Agriculture
No Drawing. Filed Nov. 1, 1971, Ser. No. 194,475
Int. Cl. C07g 7/02
U.S. Cl. 195—63                                                                7 Claims

ABSTRACT OF THE DISCLOSURE

Insolubilized but active enzymes are prepared by reacting an enzyme with tannic acid and glutaraldehyde.

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

This invention relates to and has among its objects the provision of novel water-insoluble but active enzyme products and methods for preparing them. Further objects of the invention will be evident from the following description wherein parts and percentages are by weight unless otherwise specified.

In recent years there has been considerable interest in preparing enzymes in insolubilized (sometimes referred to as immobilized) form. Such products enable enzyme-catalyzed reactions to be carried out in a simplified and efficient manner. Typically, the insolubilized enzyme is placed in a cylindrical vessel and a solution of the substrate to be reacted is passed through the enzyme column. The reaction takes place within the column and the effluent liquor contains the reaction products. With this system the enzyme can be used repeatedly for processing fresh batches of the substrate.

Various techniques have been advocated for preparing insolubilized enzymes. One procedure is to entrap the enzyme in polymerizing polyacrylamide; another is to adsorb it on insoluble media such as ion exchange resins, alumina, etc.

In accordance with the invention, insolubilized but active enzymes are prepared from enzymes which are in a normal or native (soluble) state by reacting them with tannic acid and glutaraldehyde. The reaction is generally conducted in an aqueous medium, and preferably the tannic acid and glutaraldehyde are sequentially reacted with the starting enzyme.

For the sake of brevity, the insolubilized (immobilized) enzyme products of the invention are referred to by the term "enzyme-TAG," and specifically as "lactase-TAG," "amylase-TAG," etc.

It should be noted that both tannic acid plus glutaraldehyde are essential to form the products of the invention. If tannic acid alone is used, the enzyme easily washes away, and the activity is lost. Moreover, if glutaraldehyde alone is used, great difficulty is encountered in forming an insolubilized product, particularly from a crude starting material. In sum, it is necessary to employ both tannic acid and glutaraldehyde whereby to readily attain products which are stable to repeated use, that is, which retain their activity even when used over and over again.

The invention provides many important advantages, typical examples of which are outlined below.

A primary advantage of the products of the invention is that their activity does not materially decrease during use. For instance, a particular product of the invention (lactase-TAG) was used continously for 4 days with no loss of activity under conditions wherein the ratio of substrate to enzyme reaction product was greater than 10,000 to 1. Thus, the products of the invention have the advantage not only of being reusable but also usable under conditions of continuous operation for long periods of time and with large amounts of substrates.

Another advantage of the invention is that the products are afforded by simple procedures using readily-available reactants. No exotic chemicals or complicated procedures are required. Nonetheless, the products retain the major part of the activity of the starting enzyme.

A further advantage of the invention is that useful products can be prepared from any enzyme source, including pure enzymes, enzyme concentrates, crude enzyme preparations, and even such substances as animal organs, plant parts, microbial cultures, and the like. Important in this regard is that application of the herein-described reactants causes most of the active enzyme to be selectively precipitated even where it is present in minute quantity, e.g., as little as 1 mg. of active enzyme in association with gram quantitites of inactive components. Accordingly, the invention provides the means for preparing insolubilized products from enzymes which previously were difficult to insolubilize or which were never insolubilized.

Another advantage of the invention lies in the precise control that one can exercise over the extent and direction of enzymic reactions. This results because of the solid nature of the products of the invention which allows specific amounts to be metered out to suit any particular situation.

Another advantage of the invention is that enzymic reactions can be stopped at any desired time by simply separating the solution under treatment from the insolubilized enzyme—for example, by draining the solution away from the reaction system. Thus, no external forces— such as heat, acid, and the like which might be detrimental—need be applied to short-stop the reaction.

Preparation of the products of the invention involves reaction of the starting material with tannic acid and glutaraldehyde. Water is advantageously used as the reaction medium. Temperatures employed are generally ambient (room) temperatures, or somewhat lower or higher, i.e., about the range from 1 to 40° C. Conventional expedients such as stirring or shaking are applied to attain good contact between reactants. Products and intermediates are segregated by the usual mechanical procedures of filtration or centrifugation. For best results, the aqueous reaction medium is adjusted to the pH at which the starting enzyme in question is soluble.

Preferred procedures used in a practice of the invention are described below.

The enzyme to be insolubilized is mixed with water to form a dispersion. (The term "dispersion" is used herein in a generic sense to include true solutions, colloidal solutions, or suspensions.) Where necessary, the pH of the dispersion is preferably adjusted by conventional methods to a level at which the enzyme is soluble. Appropriate pH's to use with any particular enzyme are described in the literature. In many cases a pH of about 3 to 7 is employed. It may further be noted that oftentimes the starting material already contains a buffer or other pH-adjusting agent so that when it is mixed with water the resulting dispersion will exhibit a pH at which the enzyme is most soluble. This is particularly the case with commercially-available enzyme preparations. It is obvious that in such cases there is no need to apply any pH adjustment.

Following preparation of the aqueous dispersion of the starting material, a mechanical separation step such as filtration, centrifugation, or decanting may be applied to remove any fillers, debris, or other undissolved material.

Having prepared the enzyme dispersion, one then adds thereto an aqueous solution of tannic acid. For best results this solution is first adjusted (e.g., by the addition of NaOH, KOH, or phosphate buffer) to a pH at which the enzyme in question is soluble, this pH level generally coinciding with that at which the enzyme is active. As noted above in connection with the dispersion step, this pH will be in most cases in the range of about 3 to 7.

The amount of tannic acid is not critical. Usually a large excess—for example, 10–50 parts thereof per part of enzyme—is used and the unreacted residue removed in a subsequent washing step.

The enzyme-tannic acid mixture after stirring for a brief period—e.g., about 5 minutes—may be applied directly to the next step (treatment with glutaraldehyde). Alternatively, the enzyme-tannic acid complex may be removed from the mixture for use in the next step. In such event, it is preferred to hold the mixture for a substantial period of time—e.g., about 12 to 24 hours—to ensure complete precipitation. The complex may be harvested from the mixture by such conventional techniques as filtration, centrifugation, or decanting.

Having prepared the enzyme-tannic acid mixture (or isolated complex), an aqueous solution of glutaraldehyde (usually in a concentration of about 25%) is added. The amount of glutaraldehyde is not critical. Usually, a large excess—for example, 10 to 50 parts thereof per part of enzyme—is used; the unreacted residue is removed in a subsequent washing step.

The resulting mixture (enzyme, tannic acid, and glutaraldehyde) is held for a period of time, preferably with mild agitation, to ensure formation of the enzyme-TAG product. Usually, the holding is for a period of about 12–24 hours in a cold room at about 1 to 10° C. The product is then collected by centrifugation, preferably with the use of a refrigerated centrifuge. To wash out unbound enzyme and reagents, the collected product is resuspended in fresh water and recentrifuged. These steps of suspension in water and centrifugation are preferably repeated until a product of desired purity is achieved.

The so-prepared enzyme-TAG product is dried if it is to be preserved for future use. Drying from the frozen state (lyophilization) is preferred to avoid heat-damage to the product.

For use in conducting enzymic reactions, the enzyme-TAG product can be used directly, particularly if it exhibts a granular or crystalline form. Usually, it is preferred to mix the complex with an inert carrier or support, preferably a solid water-insoluble material in subdivided form. Typically, one can use such carriers as diatomaceous earths, crushed firebrick, calcined rice hulls, sand, ground oyster shells, bone ash, charcoal, cellulose, or other inert water-insoluble particulate solid.

Since incorporation with a carrier provides a mass through which water and other liquids can percolate readily, the carrier can be incorporated with the crude product before the washing step, whereby removal of unbound enzyme and reagents is facilitated. In a typical practice of this modification of the invention, the crude product is mixed with about 5–10 times its weight of a carrier, and a column is packed with the resulting composition. Water is then passed through the column in sufficient quantity to remove all water-soluble components.

The invention is of wide versatility and can be applied to enzymes of all kinds, illustrative examples being alcohol dehydrogenase, amino acid oxidase, α- and β-amylases, arginase, asparaginase, catalase, cellulase, chymotrypsin, collagenase, deoxyribonuclease, diaphorase, elastin, emulsin, ficin, glucose oxidase, histidase, hyaluronidase, invertase, lactase, peroxidase, phosphatases, lipase, lipoxidase, lysozyme, papain, chymopapain, pepsin, pectin methyl esterase, polyphenol oxidase, rennin, ribonuclease, trypsin, tyrosinase, urease, etc. The starting enzyme need not be a purified substance but may be a preparation containing an enzyme. Thus, for example, one may employ microbial preparations which contain enzymes, typically, cultures or cells of yeasts, molds, bacteria, and the like. Other enzyme-containing preparations which may be applied to the process of the invention are such materials as animal organs, e.g., pancreas, liver, etc., insects and insect parts, barley malt, pineapple, papaya, etc.

The products of the invention can be utilized in a variety of ways. A few examples are provided below by way of illustration and not limitation.

One particular application of the invention concerns the disposition of whey, the watery part of milk left over from cheese manufacture. Currently, whey is discarded into rivers, lakes, and other bodies of water with detrimental effects on the environment. The biological oxygen demand (referred to in the art as B.O.D.) of the water is raised, thus producing an imbalance in nature. As corrective legislation is enacted, companies will be forced to pay a high price for disposal of whey by other means.

Protein can be separated from whey, leaving a material composed essentially of lactose. Although the protein is beneficial as a food supplement, the lactose cannot be utilized. Thus, recovery of protein from whey is uneconomical. However, as a result of the invention lactose can be efficiently converted into galactose and glucose. These sugars are useful as fermentation media, e.g., in the culturing of yeast. The combined monetary rewards for the protein and the hydrolyzed lactose would, therefore, make it advantageous for the cheese producer to retain the whey. Of course, this economical advantage must be considered with respect to the price the manufacturer would have to pay for disposal of the whey.

The following example describes an application of the invention to the aforementioned problem. First, lactase-TAG is prepared by the method described herein. Then, the protein is removed from the whey by conventional means. The de-proteinized whey is pumped through a column containing the lactase-TAG. The resulting galactose and glucose are collected in the effluent and used as desired.

The invention can also be applied to the removal of protein colloids from beer, wine, fruit juices, etc., so that they are no longer turbid. In this particular embodiment of the invention, protease-TAG is prepared and mixed with the cloudy liquid, e.g., beer. After a time sufficient to allow the enzyme to attack the proteinaceous material, the mixture is centrifuged. The result is a clarified liquid which will not become cloudy when held under refrigeration. Alternately, a column packed with protease-TAG may be used, and the beer to be clarified can be pumped through said column.

Other applications include hydrolyzing starch to glucose, inverting sucrose solutions for the manufacture of candy, conversion of glucose to fructose, deglucosing egg whites, conversion of dilute alcohol solutions to vinegar, and the like.

It is believed that formation of the products of the invention involves a complexing between the enzyme molecules and the tannic acid molecules, the resulting complex being cross-linked by the glutaraldehyde. In this way, the enzyme becomes attached to a "rigid backbone." Said attachment is probably between the amino, hydroxyl, or sulfhydryl groups of the enzyme and the acid and aldehyde portions of the tannic acid and glutaraldehyde.

EXAMPLES

The invention is further demonstrated by the following illustrative examples.

Example 1.—Preparation of lactase-TAG

The starting material was a commercial product (Wallerstein lactase LP), the lactase content of which was estimated to be about 10%.

The lactase preparation (0.3 g.) was dissolved in 15 ml. of doubly-distilled water (pH 7.0). To this was added 10 ml. of 10% aqueous tannic acid solution which had been adjusted to pH 4.5 with sodium hydroxide. After stirring for 5 min., 2.4 ml. of 25% aqueous glutaraldehyde solution was added. The mixture was stirred gently overnight at 34° F. The mixture was centrifuged for 10 min. at 10,000 r.p.m. in a refrigerated centrifuge. The liquid was discarded and the crude product was suspended in distilled water and centrifuged. This purification process (suspending in water and centrifuging) was repeated four times and, finally, the product was collected. The lactase-TAG complex exhibited 60% of the activity of the original enzyme.

Example 2.—Lactase-TAG hydrolysis of lactose

Lactase-TAG prepared as described in Example 1 was added to 500 mg. of "Celite," a diatomaceous filter aid. The mixture was thoroughly blended with a stirring rod to give a free-flowing powder which was packed into an 8 mm. jacketed column (2 cm. long) over a bed of sand, using gentle tamping with a stirring rod. The column was then washed several times with pH 4.5 (0.02 M) phosphate buffer.

A lactose solution (3.0% in 0.02 M phosphate buffer) was then fed through the column at varying flow rates, using a pressure of inert gas to aid the movement of liquid from the feed reservoir. The column temperature was regulated by passing warm water through the column jacket. The extent of hydrolysis was determined by analyzing for glucose in the effluent with a "Glucostat" reagent.

The results are summarized below:

| Temp., °C | 36 | 37 | 37 | 36 | 45 | 45 | 55 | 55 |
|---|---|---|---|---|---|---|---|---|
| Flow, ml./min | 0.36 | 0.41 | 0.58 | 0.71 | 0.25 | 0.61 | 0.42 | 0.62 |
| Percent hydrolysis | 86 | 90 | 83 | 80 | 96 | 93 | 96 | 96 |

Example 3.—Continuous use of lactase-TAG column

An insolubilized enzyme was prepared as described in Example 1 from 30 mg. of commercial lactase preparation, 0.75 ml. of 10% aqueous tannic acid solution (pH 4.5), and 0.24 ml. of 25% aqueous glutaraldehyde solution.

A column was prepared as described in Example 2 from the lactase-TAG and 500 mg. of Celite. The column was 10 cm. long and 5 mm. in diameter.

A 3% lactose solution was applied to the column in a down-flow manner at a rate of 30 ml. per hour at 45° C. The solution was applied continuously for a period of 4 days and daily tests were made of the effluent to determine the extent of hydrolysis at that time.

The results are tabulated below:

Time, days: Hydrolysis, percent
1 ---------------------------------------- 52
2 ---------------------------------------- 52
3 ---------------------------------------- 52
4 ---------------------------------------- 52

Example 4.—Glucose oxidase-TAG

Glucose oxidase-TAG was prepared by a method similar to that described in Example 1 from a commercial glucose oxidase preparation, estimated to contain 10% of active enzyme. In this case, 2 g. of the enzyme preparation, 2 ml. of 10% aquous tannic acid soltuion at pH 5, and 0.6 ml. of 25% aqueous glutaraldehyde were used.

A column was prepared as described in Example 2 and applied to a 0.35% glucose solution containing 0.3% hydrogen peroxide.

The results are summarized below:

| Temp., °C | 35 | 45 |
|---|---|---|
| Flow, ml./min | 0.33 | 0.33 |
| Conversion, percent | 70 | 74 |

Example 5.—Preparation of catalase-TAG

A commercial catalase preparation (20 mg.) was dissolved in 1 ml. of water and to this was added 1 ml. of 1% aqueous tannic acid solution which had been adjusted to pH 7.0. After stirring for 5 min., 0.3 ml. of 25% aqueous glutaraldehyde solution was added, and the mixture stirred gently overnight at 34° F.

The mixture was then centrifuged for 10 min. at 10,000 r.p.m. in a refrigerated centrifuge. The liquid was discarded and the crude product was suspended in distilled water and centrifuged. This purification process (suspending in water and centrifuging) was repeated four times, and the product was then collected. The catalase-TAG product exhibited 52% of the activity of the original enzyme.

Having thus described our invention, we claim:

1. A process for preparing an insoluble but active enzyme which comprises—
   (a) dispersing a soluble enzyme in water,
   (b) incorporating with the dispersion an aqueous solution of tannic acid,
   (c) incorporating into the dispersion an aqueous solution of glutaraldehyde, and
   (d) separating the resulting enzyme-tannic acid-glutaraldehyde reaction product.

2. A process for preparing an insoluble but active enzyme, which comprises—
   (a) dispersing in water a substance containing active soluble enzyme,
   (b) incorporating with the dispersion an aqueous solution of tannic acid,
   (c) separating the resulting enzyme-tannic acid complex, and
   (d) reacting the so-formed complex with glutaraldehyde to yield an enzyme-tannic acid-glutaraldehyde reaction product.

3. An insoluble but active enzyme comprising a complex of a soluble enzyme and tannic acid, cross-linked with glutaraldehyde.

4. The product of claim 3 wherein the enzyme is a sugar-hydrolyzing enzyme.

5. The product of claim 3 wherein the enzyme is a glucose-oxidizing enzyme.

6. The product of claim 3 wherein the enzyme is a protein-degrading enzyme.

7. The product of claim 3 wherein the enzyme is a hydrogen peroxide-degrading enzyme.

References Cited
UNITED STATES PATENTS

| 3,627,640 | 12/1971 | Blumberg et al. | 195—68 |
| 3,147,196 | 9/1964 | Ziegler et al. | 195—68 X |
| 3,654,083 | 4/1972 | Moelker | 195—DIG. 11 |
| 3,669,841 | 6/1972 | Millet | 195—68 X |

DAVID M. NAFF, Primary Examiner

U.S. Cl. X.R.
195—68, DIG. 11